Sept. 29, 1970     J. L. MORE ET AL     3,530,986

SCREEN APPARATUS

Filed April 24, 1967     3 Sheets-Sheet 1

INVENTORS
John L. MORE
Flor KAT

ATTORNEY

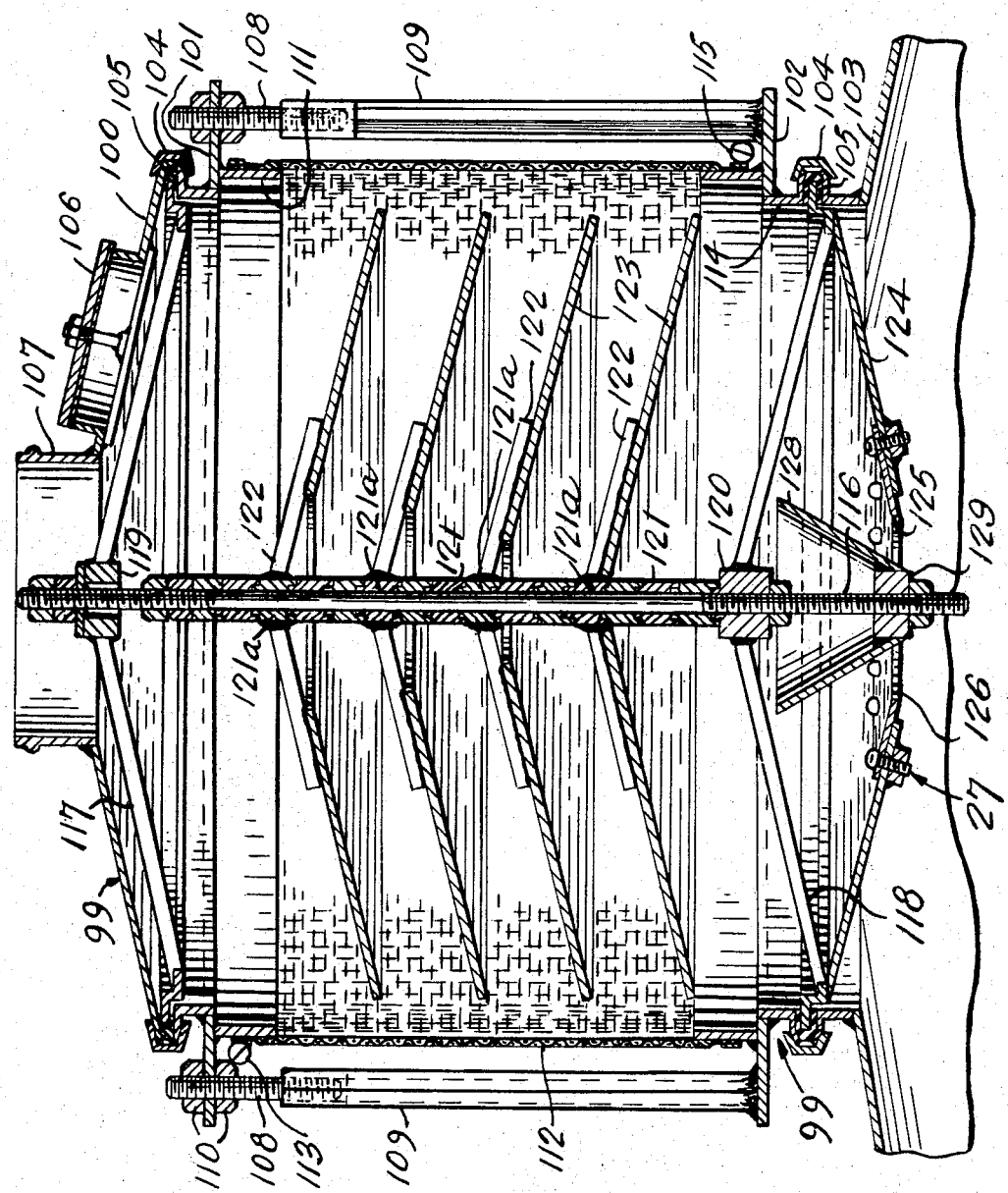

3,530,986
SCREEN APPARATUS
John L. More, Montreal, Quebec, and Flor Kat, La Salle, Quebec, Canada, assignors to Separator Engineering Ltd., Montreal, Quebec, Canada
Filed Apr. 24, 1967, Ser. No. 632,997
Claims priority, application Canada, May 4, 1966, 959,590
Int. Cl. B07b 1/28, 1/38, 1/42
U.S. Cl. 209—234               5 Claims

ABSTRACT OF THE DISCLOSURE

A screening apparatus of the type in which the screen makes vibratory and gyratory motions employing such a vertically extending tubular screen alone or in combination with such a horizontally extending screen, and means within the vertical tubular screen and carried thereby for laterally deflecting material flowing down through the vertical screen to impinge the material against the inner surface of the vertical screen.

---

This invention relates to apparatus suitable for separating a solid from a liquid medium in which it is dispersed and for grading dry solids on the basis of particle size.

Many forms of apparatus have been devised which include screens for trapping solid material while permitting the passage of a liquid carrier medium, and there are many forms of apparatus suitable for grading dry solids. It is an object of the present invention to improve the efficiency of apparatus of this type.

Broadly, in accordance with this invention, there is provided apparatus comprising a screen of generally hollow form having an inner surface and an outer surface, means for impinging the material to be treated onto one of said surfaces and means for imparting vibratory and gyratory motions to said screen.

The present invention is particularly suitable for use in bark dewatering and stock thickening operations of papermaking and the following description, keyed to the drawings, is directed to that particular manufacturing field. However, the invention is suitable for use in many types of operations where solids are to be separated from a portion of a carrier liquid or where solids are to be graded.

The invention will now be described in detail with reference to the accompanying drawings, illustrating preferred embodiments and, in which:

FIG. 8 is a vertical cross section through another form of apparatus.

Figure 1:
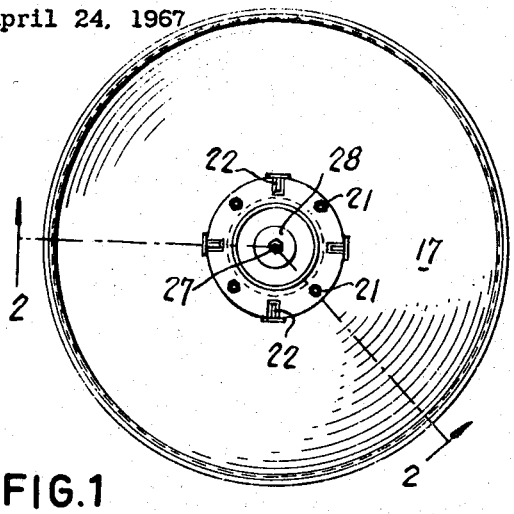
FIG. 1 is a top plan view of separating apparatus having a vertical cylindrical screen and a horizontal screen.
Figure 2:
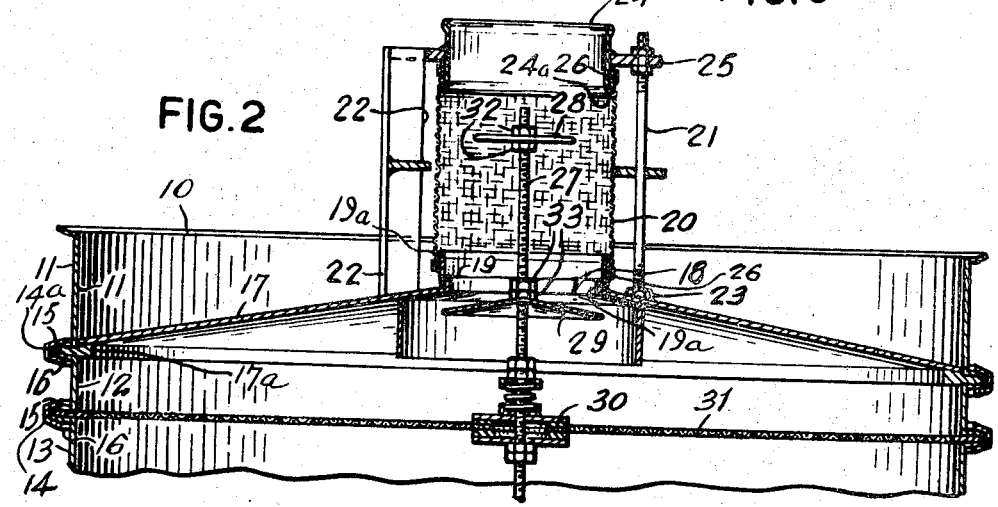
FIG. 2 is a section on the line 2—2 of FIG. 1.

Referring firstly to FIGS. 1 and 2, these figures illustrate a vertical screen arrangement as applied to separating apparatus of the type generally illustrated in, for example, U.S. Pat. Nos. 2,696,302 (Miller, Mathewson and Meinzer) issued Dec. 7, 1954 and 2,753,999 (Miller, Mathewson and Meinzer) issued July 10, 1956. The separating apparatus includes a cylindrical casing 10 composed of a number of superposed sections, the upper three of which, referenced 11, 12, 13, are illustrated. Gaskets 14 are interposed between outwardly directed upper flanges 15 and corresponding outwardly directed lower flanges 16 and clamp rings 14a surround the sections, the clamp rings, together with the gaskets 14, connecting the sections 11, 12 and 13 in a fluid-tight manner. The casing section 11 has secured thereto a frusto-conical cover 17 which has a central aperture 18, the cover 17 and section 11 being mounted by means of a ring 17a welded to the cover 17 and clamped between the flanges 15 and 16 by the ring 14a. A cylindrical wall 19 extends upwardly from the cover 17 and constitutes a short, vertical duct leading to the aperture 18. The wall 19 also constitutes a mounting for a lower end of a vertically arranged screen 20.

To mount the upper end of the screen 20, a circular array of vertically elongated bolts 21 and a circular array of T-shaped supports 22 are provided, bolts 21 alternating with supports 22. The supports 22 have their lower ends welded to the upper surface of the cover 17, and the lower ends of the bolts 21 are received in nuts 23 which are also welded to the cover 17. The arrays of bolts and supports carry, at their upper ends, a short, cylindrical element 24 which is welded to, and is surrounded by, an annular collar 25. The collar 25 has bores to receive the bolts 21 and slots to receive the supports 22. Adjustable lock nuts hold the collar 25 and element 24 in any desired position vertically of the bolts 21 and supports 22 and thus permit the desired tension to be applied to the screen 20. The element 24 forms a short, inlet duct for the solid material and carrier liquid and is connected, in conventional manner, to a flexible conduit (not shown). As will be explained hereinafter, all the illustrated structures perform vertical oscillatory and horizontal gyratory motions and said conduit must therefore be made flexible to permit such motions to occur without restraint and without transferring these vibrations to other fixed parts of the plant. The screen 20 is mounted between the element 24 and the wall 19 and is held in position by the presence of the bead arrangements 24a and 19a at the lower edge of the element 24 and at the upper edge of the wall 19 respectively and by cooperating band clamps 26.

A central spindle 27 extends vertically through the aperture 18 and carries at spaced intervals along its length a deflection disc 28, a control cone 29, and a central tie down 30 for a horizontal screen 31. The lower end of the spindle 27 is mounted, in conventional manner, as illustrated in the U.S. patents referred to above, on the lowermost of the cylindrical sections of the casing 10.

The disc 28 is adjustable vertically on the spindle 27 and lock nuts 32 are provided which mesh with the threaded portion of the spindle 27. Thus, clamping of the disc 28 in any desired position is possible.

Similarly, the control cone 29 is adjustable along the spindle 27, there being a pair of cooperating nuts 33 for clamping the cone 29 in any desired position. One of these nuts is welded to the cone 29.

As will be understood by persons skilled in the art, the entire structure illustrated in FIG. 2 is subjected, during operation of the separator, to vertical, oscillatory movements and to gyratory motions in a generally horizontal plane. The stock to be thickened enters the illustrated structure via the conduit connected to the element 24 and cascades onto the disc 28. The disc 28 is required to promote side velocity in the screening area, such side velocity causing a percentage of carrier liquid to flow through the screen 20 and onto the top surface of the cover 17. Suitable ports (not illustrated) are provided in the casing part 11 through which the carrier liquid flowing outwardly over the cover 17 is discharged.

The solid material is retained by the screen 20 and flows with the carrier liquid which failed to pass through the screen 20, onto the control cone 29 and thence to the horizontal screen 31 for further separation of the solid from the water. The function of the control cone 29 is to throttle the flow to the horizontal screen. However, the effectiveness of this cone is somewhat limited by the minimum spacing which can be permitted between the cone and the cover 17. An opening which is relatively small tends to become completely blocked by larger pieces of solid material.

In tests of the apparatus illustrated in FIGS. 1 and 2, it was found that the structure was capable of handling a far greater flow than was the screen 31 before the vertical screen 20 was incorporated into this structure.

The remaining figures of the drawings illustrate modified forms of vertical screens which can be employed in place of the relatively simple screen structure of FIGS. 1 and 2. However, it will be understood that in each of these constructions the vertical screen arrangement is attached to the remainder of the separating unit in such manner that horizontal gyratory and vertical oscillatory motion is imparted thereto.

Figure 3:
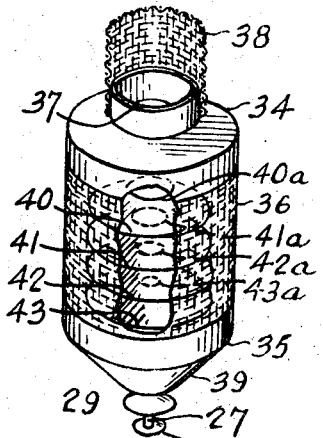
FIG. 3 is a perspective view of a vertical screen having a plurality of discs for directing a carrier liquid and solid material outwardly against the inner surface of the screen.

Turning now to FIG. 3, there is shown a screen structure including annular top and bottom caps 34 and 35 mounting a vertical, cylindrical screen 36, the top cap 34 having a short inlet duct 37 connected to a flexible stock feed conduit 38, and the bottom cap 35 including a conical portion 39 forming the discharge duct for solids and liquids which do not pass outwardly through the screen 36. The spindle 27, control cone 29 and tie down 30 are also illustrated in FIG. 3.

Mounted within the screen 36 is a vertical series of deflectors 40, 41, 42, and 43, each of upright frusto-conical form and with central openings 40a, 41a, and 42a in the three upper deflectors 40, 41, and 42.

The openings 40a–42a in the deflectors 40–42 are of different sizes with each deflector having a larger opening than the deflector beneath it. By way of example, if the screen 36 is twenty-four inches in diameter and twelve inches in height, the deflectors 40–42 preferably have an overall diameter of twenty-two inches and openings of six inches, five inches and three and one-half inches. The lower deflector 43, also having an overall diameter of twenty-two inches, need not be apertured.

The stock entering via a duct 37 flows partly through the opening 40a and partly onto the upper surface of the deflector 40. The water and dispersed solid material which impinges on the deflector 40 flows outwardly over its sloping upper surface and is discharged outwardly against the interior of the screen 36 whereby some of the water flows through the screen and is discharged. The stock passing through the opening 40a flows partly onto the upper surface of the deflector 41 and partly through smaller opening 41a. It will thus be understood that the deflectors 40 through 43 divide the stock flow into four parts or "umbrellas" and direct these four umbrellas against the screen 36 at four different vertical locations. This greatly improves the efficiency of thickening and makes the most efficient use of the screen area provided. Solid material, and water which does not flow through the screen 36, passes through the conical portion 39 for further thickening.

Figure 4:
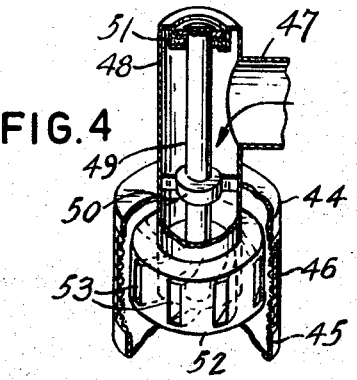
FIG. 4 is a perspective view, partly cut away, of a screen arrangement in which the feeder for the carrier liquid and the solid material rotates.

FIG. 4 illustrates a vertical screen arrangement including top and bottom caps 44 and 45 and a vertical, cylindrical screen 46 mounted on the caps 44 and 45. A horizontal stock feed pipe 47 communicates with the interior of a stationary, vertical casing 48 leading downwardly through a central opening in the top cap 44 to the interior of the screen 46. Within the casing 48 there is provided a vertical shaft 49 rotatably mounted in bearings 50 and 51 which are themselves supported by the casing 48. At the lower end of the shaft 49 there is mounted a rotary feeder or distributor generally indicated at 52. The feeder 52 is annnular in form and includes a plurality of curved passages leading from its hollow interior to its exterior. It will be noted that the hollow interior of the feeder 52 is in communication with the casing 48 and hence is in communication with the infeed pipe 47. Suitable sealing and bearing means (not illustrated) can be provided between the lower end of the casing 48 and the feeder 52 or alternatively, some leakage at this point not being detrimental to the operation of the illustrated structure, a working clearance can be left.

Flow of stock through the pipe 47 is led to the interior of the feeder 52 via the casing 48 and is then discharged against the screen 46 through the passages 53.

Discharge of stock through the passages 53 causes the feeder 52 to rotate (anti-clockwise as viewed in FIG. 4) so that the greatest possible area of the screen 46 has stock fed thereagainst. Once again, this promotes the most efficient use of the screen's area.

Figure 5:
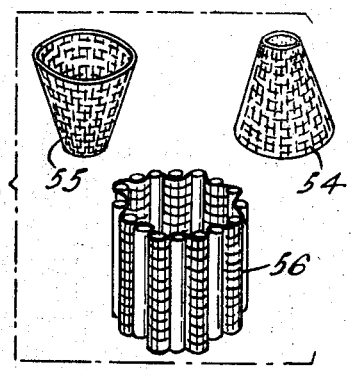
FIG. 5 illustrates three types of non-cylindrical vertical screens.

The three forms of screen illustrated in FIG. 5 are suitable for use in certain circumstances in place of the cylindrical screen 20. The screen 54 is frusto-conical in form, the screen 55 is inverted frusto-conical, and the screen 56, in cross-section, is corrugated thereby to provide increased screening area when compared with a cylindrical screen of comparable overall diameter.

Figure 6:
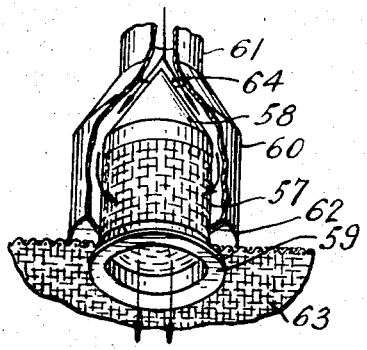
FIG. 6 is a perspective view of a screen arrangement in which the carrier liquid is fed through the screen from the outside to the inside.

Turning now to FIG. 6, this figure diagrammatically illustrates a vertical dewatering or stock thickening screen which differs from the arrangement of FIG. 2 only in that the stock flows from the exterior of the screen to the interior. The cylindrical screen 57 is mounted on a conical upper cap 58 and a lower element 59 which is in the form of a duct. The screen 57, upper cap 58 and part of the lower element 59 are surrounded by a casing 60 having integral therewith an inlet duct 61 and a lower, inwardly directed annular wall 62. The inner periphery of the wall 62 is spaced from the screen 59 by a sufficient distance to permit the vertical and horizontal motions of the screen 57 to be performed without contact between the screen and the stationary casing 60 and further being sufficient to permit the thickened stock to flow onto a horizontal screen 63 via the gap between the wall 62 and the screen 57. The screen 57 terminates at its lower end immediately above, or at the same level as, the screen 63.

The path of flow of the stock is as illustrated by the arrows 64 in FIG. 6, the stock entering via the duct 61 and being directed by the conical upper cap 58 into the annular gap between the casing 60 and the screen 57. Excess water flows through the screen 57 and thence thorugh the duct 59. Thickened stock passes between the wall 62 and the screen 57 onto the screen 63 for further thickening.

Figure 7:
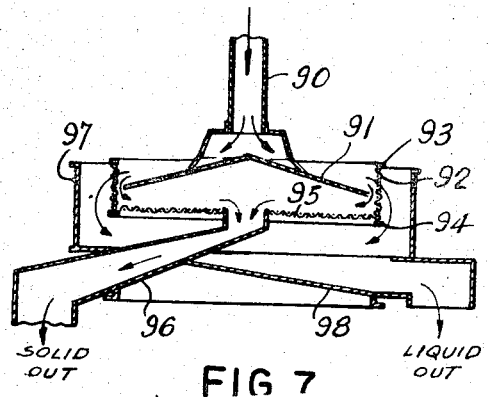
FIG. 7 is a vertical cross section through a further form of separating apparatus.

Referring finally to FIG. 7, there is diagrammatically illustrated in this figure a stock thickener which includes a stationary stock inlet duct 90 having a conical deflector mounted at the lower end thereof. A vertical screen 92 surrounds the deflector 91 and has a diameter slightly exceeding that of the deflector 91. The screen 92 is mounted on rings 93 and 94, the ring 94 also forming the outer mounting for horizontal screen 95. A duct 96 leads downwardly from the centre of the screen 95 and forms at the same time an anchorage for a screen 95. The vertical screen 92 is closed by a cylindrical casing 97 having integral therewith an outflow pipe 98 for water separated from the stock.

The stock entering via the duct 90 flows over the upper surface of the deflector 91 and is discharged over the edge thereof and into contact with the screen 92. Water flows through the screen 92 and is discharged via the pipe 98. Thickened stock then flows onto the upper surface of the screen 95 and further dewatering takes place, the dewatered stock eventually being discharged through the duct 96.

It will be understood by a person skilled in the art that the adjustment of the eccentric weights of the motor (not illustrated) which imparts gyratory and oscillatory movements to the structure illustrated permits the stock to be given a travel which is inwardly over the other surface of the screen 95 towards the centre discharge pipe 96.

FIG. 8 illustrates a form of separating apparatus incorporating many features of the apparatus previously described, this specific apparatus consisting of a casing 99 including upper casing parts 100 and 101, and lower casing parts 102 and 103. Clamp rings 104 hold the parts 100, 101, and 102, 103 in assembled relationship, there being interposed sealing gaskets 105.

The casing part 100 includes an inspection port arrangement 106 and, centrally thereof, a short upstanding duct 107 adapted for connection to an infeed pipe (not shown). The casing part 101 is supported in a vertically adjustable manner by studs 108 welded at the upper end of stanchions 109 constituted by angle irons. The lower ends of the stanchions 109 are welded to the casing part 102. Pairs of lock nuts 110 permit the part 101 to be vertically adjusted along the studs 108 and locked in position.

A ring 111, welded to the casing part 101, forms a support for the upper end of a cylindrical screen 112, a clamping ring 113 being employed to retain the screen 112 against the ring 111. The lower end of the screen 112 is supported in an analogous manner by means of a ring 114 welded to the casing part 102 and a clamping ring 115.

A central, vertical spindle 116 extends axially of the casing 99 and is supported from the casing 99 by upper and lower sets of outwardly extending struts 117 and 118 respectively. The strut sets 117 and 118 are welded to blocks 119 and 120, and a plurality of collars 121 are slipped over the spindle 116 above the block 120. Certain of these collars, referenced 121a, have outwardly extending arms 122 welded thereto and the outer ends of these arms support annular, downwardly and outwardly sloping plates 123. Of the four plates 123 provided the upper three have central apertures and the lower one is unapertured. The size of the aperture progressively decreases from each plate to the next lower one.

The arrangement including the collars 121 makes it possible to adjust the relative positions of the plates 123 in an easy manner.

At the lower end of the casing 99 there is provided an annular bottom plate 124 having a central aperture 125 for permitting material (thickened stock or granular material too large to pass through the screen 112) to be discharged. A replaceable annulus 126, bolted at 127 to the plate 124, provides a coarse adjustment of the size of the aperture 125 and hence the back-up of material in the casing 99. Fine adjustment is obtained by means of a cone 128 mounted by way of a block 129 on the spindle 116 and vertically adjustable along the spindle.

We claim:

1. Apparatus for treating material by screening, grading or separating the material, comprising a vertical screen of uniform mesh and of generally tubular form having an inner surface and an outer surface, means for centrally feeding the material into the tubular screen at its upper end to flow downwardly through the screen, means supported by the screen and located within the screen in the path of the downwardly flowing material to deflect the material against areas of the inner surface of the screen whereby some of said material passes through the screen at said areas and the remainder of the material is retained within the screen, a horizontal screen below the vertical screen receiving the remainder of the material, means for imparting vibratory and gyratory motions to said screen and said means, and said horizontal screen.

2. Apparatus, as defined in claim 1, wherein said screen has a shape selected from cylindrical, frusto-conical, and generally tubular with vertically extending corrugations.

3. Apparatus as claimed in claim 1 including a single prime mover, and a shaft connected thereto carrying eccentric weights serving to impart vibratory and gyratory motions to both the vertical and horizontal screens.

4. Apparatus as claimed in claim 1, wherein the means for deflecting the material comprise a plurality of vertically spaced apart annular plates extending substantially transversely to the vertical axis of the screen, the plates attached to a central support member, which support member is carried by a mounting for the screen.

5. Apparatus as claimed in claim 4, wherein all the plate members, except for the lowermost plate member, have a centrally located aperture, the uppermost plate member having the largest aperture with the apertures in the other plate members decreasing in size.

References Cited

UNITED STATES PATENTS

| 1,888,636 | 11/1932 | O'Toole | 209—275 X |
| 2,415,268 | 2/1947 | Wendt | 210—389 |
| 2,563,249 | 8/1951 | Koziol | 209—366.5 X |
| 2,753,999 | 7/1956 | Miller et al. | 209—403 |
| 2,782,927 | 2/1957 | Derrick | 209—302 X |
| 690,777 | 1/1902 | Schiller | 209—306 |
| 869,085 | 10/1907 | Hiller | 209—306 |
| 2,220,706 | 11/1940 | Cantin | 210—456 X |
| 3,394,809 | 7/1968 | Hunter | 209—306 X |
| 3,421,623 | 1/1969 | McKibben | 209—243 |

FOREIGN PATENTS

| 446,797 | 2/1948 | Canada. |
| 506,626 | 11/1951 | Belgium. |
| 500,149 | 5/1930 | Germany. |
| 203,353 | 10/1958 | Austria. |
| 641,560 | 5/1962 | Canada. |
| 323,628 | 7/1920 | Germany. |
| 13,593 of 1906 | 5/1907 | Great Britain. |
| 156,547 | 11/1904 | Germany. |

TIM R. MILES, Primary Examiner

U.S. Cl. X.R.

209—254, 302, 326, 366.5; 210—388, 456